No. 736,125. PATENTED AUG. 11, 1903.
A. V. MESEROLE.
STORAGE BATTERY.
APPLICATION FILED MAY 14, 1903.
NO MODEL.
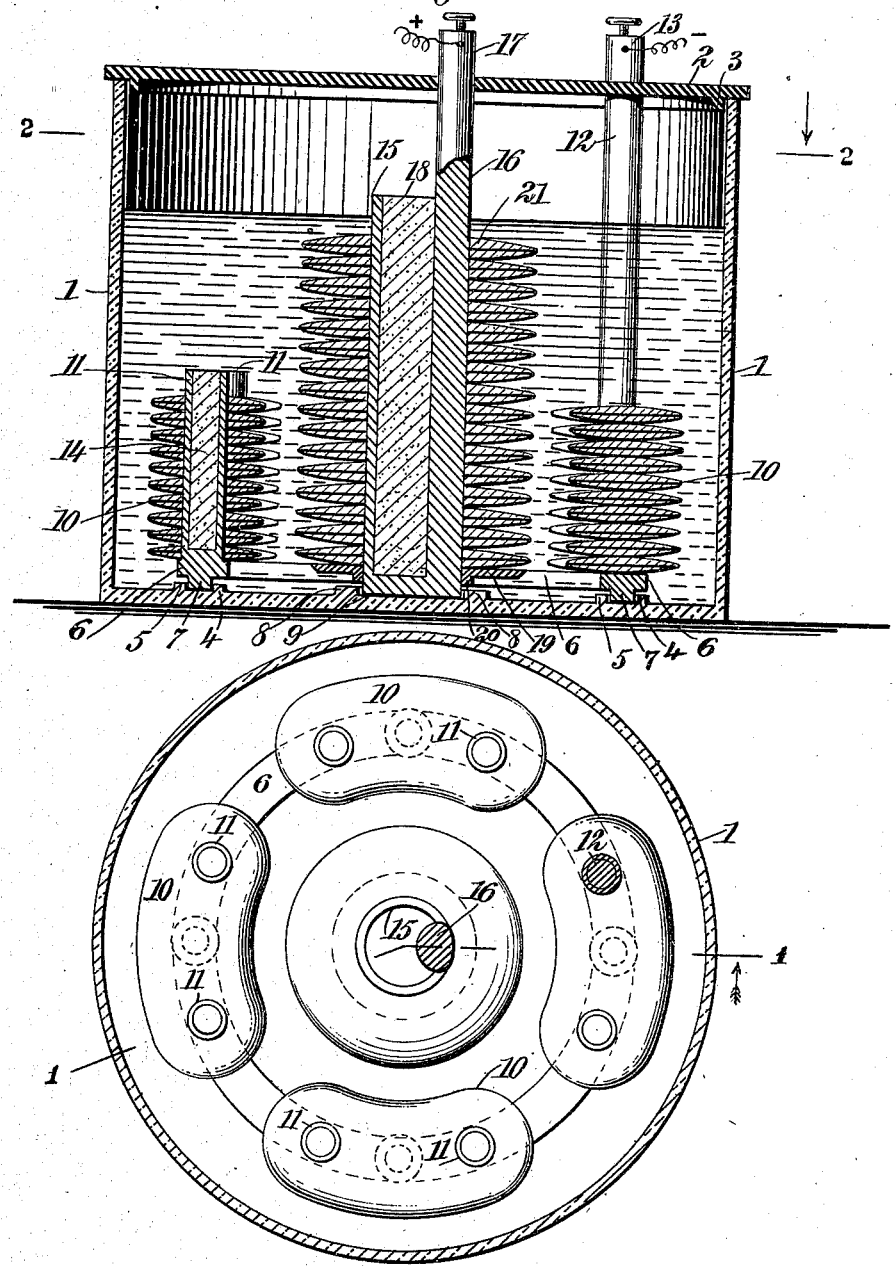
WITNESSES:
INVENTOR
Abraham V. Meserole
BY
ATTORNEYS.

No. 736,125. Patented August 11, 1903.

UNITED STATES PATENT OFFICE.

ABRAHAM V. MESEROLE, OF NEW YORK, N. Y.

STORAGE BATTERY.

SPECIFICATION forming part of Letters Patent No. 736,125, dated August 11, 1903.

Application filed May 14, 1903. Serial No. 157,087. (No model.)

*To all whom it may concern:*

Be it known that I, ABRAHAM V. MESEROLE, a citizen of the United States, and a resident of the city of New York, borough of Brooklyn, in the county of Kings and State of New York, have invented a new and Improved Storage Battery, of which the following is a full, clear, and exact description.

My invention relates to storage batteries and to other batteries in which active absorbent material is employed for the purpose of supplying an electric current through an electrolyte to fixed conductors or poles.

My object is to produce a form of battery and of elements therefor admitting of general use, and particularly adapted for use in storage batteries of various kinds.

My invention consists mainly of an improved mechanical construction of the battery elements.

My battery is available for use with quite a number of the active materials generally employed in batteries of similar character.

Among the more immediate objects of my invention are, first, to effectively utilize a comparatively large percentage of the theoretical energy of a given amount of absorbent material employed in the battery elements; second, to effectively incorporate a comparatively large mass of active material in each of the battery elements; third, to compensate for the slight expansion of the battery elements and of the material composing them; fourth, to increase the durability and so-called "holding" qualities of the cell.

Reference is to be had to the accompanying drawings, forming a part of this specification, in which similar characters of reference indicate corresponding parts in all the figures.

Figure 1 is a vertical section through my battery complete, taken upon the line 1 1 of Fig. 2 looking in the direction of the arrow. Fig. 2 is a horizontal section of the same upon the line 2 2 of Fig. 1 looking in the direction of the arrow, and Fig. 3 is an enlarged vertical cross-section through one of the wafers employed.

A containing vessel is shown at 1 and may consist of any desired insulating material. It is provided with a cover 2, having an annular bead 3 for holding the cover in position, these parts being of the usual or of any desired construction. Within the bottom of the vessel 1 and preferably integral therewith are annular beads 4 5 for supporting a ring 6, this ring having a bead 7, which rests between the beads 4 5. The bottom is also provided with a bead 8 of smaller diameter, the center 9 of which forms a resting-place for one of the battery elements hereinafter described. The ring 6 is provided with a number of short cylindrical tubes 11, as indicated in Figs. 1 and 2, and is also provided with a single tube 12 of comparatively great length, the upper portion of which is formed into a binding-post 13. The short tubes are preferably integral with the ring 6 and are made of the metal suitable for the pole in question. For instance, if the active materials of the battery consist of two oxids of lead the short tubes 11, the ring 6, and the long tube 12 are made of lead. Within each of the tubes 11 12 is a mass 14, of insulating material, preferably rubber; but pitch also may be used. The purpose of the tubular form is to expose a large surface to the liquid and to the active material. The several short tubes 11 are usually arranged in pairs, as shown in Fig. 2, and upon each pair is mounted a stack of wafers 10 of the form shown in Figs. 1 and 3, the construction of these wafers being described in detail below. In the center of the battery and resting in the depression 9 is a larger central tube 15, the general construction of which is similar to that of the shorter tubes 11. This tube 15 has a rib 16 to give it additional strength, the upper end of the rib 16 being formed into a binding-post 17. The binding-posts 13 and 17 therefore are the battery-terminals. The tube 15 is filled with an insulating material 18, such as rubber or pitch, this filling being for the purpose of making the tube strong and somewhat elastic and also to protect the interior portion from oxidation.

Mounted upon the exterior of the tube 15 is an end plate 19, preferably made of insulating material and provided with a band 20 to form a firm foundation for the pole. Also mounted upon the tube 15 is a stack of annular wafers 21, which fit the tube rigidly, this stack of wafers, with the tube 15 and the binding-post 17, forming one of the electrodes, the other electrode having the ring 6, tubes 11 12, and the wafers 10.

The active material in the form of a plastic paste is spread out into thin layers, each preferably of the consistency of stiff dough. A number of these layers are placed together like the leaves in a book. A sheet of metal is placed upon the top and bottom of the pile, and other layers of active material are placed together and laid under the sheet of metal, so as to form a composite structure, consisting of a metal sheet at the top, then several successive layers of active material, then another sheet of metal, more layers of active material, &c. By means of a stamp the wafers are next cut out, so as to have the form indicated in Fig. 2, and are allowed to dry. Each of the wafers 10 has preferably a kidney shape, but is comparatively thin. The structure of the annular wafers 21 is substantially the same as that just described with reference to the wafers 10 with the exception of the general shape of the wafers. I find that by constructing the wafers as just described the active material is disposed to better advantage, for the reason that the wafers have a sort of grain which facilitates the absorption of the liquid into its composition and also allows in a measure for the expansion and contraction of the material. When these wafers are dry, the liquid penetrates by capillary attraction and their absorbent qualities are much greater than those of tablets, in which the active material is merely packed in the usual manner.

Referring to Fig. 3, the metallic plates are seen at the top, bottom, and middle of the tablet, whereas the layers $a\ b\ c\ d\ e\ f$ represent the active material. Openings $g\ h$ are for the purpose of mounting the wafers upon the tubes 11 12. The layers of plastic material and the interposed metal plates are extremely thin, the wafers conforming to the shape of the die used to make them. When the battery is charged, the expansion of the material composing the wafers separates the metal plates at the edges. For this reason I prefer to have either the lower or both upper and lower surfaces of the wafers made of very thin metal, and then pressed in the curved form shown in Figs. 1 and 3.

I am aware that various arrangements of plates to compensate for expansion have been used; but so far as I know it has never been compensated by using the form of composite wafers herein described, being at first malleable or plastic and becoming after use hard and firmly cemented together after expanding as stated above.

As to the general nature of the materials employed and as to the general proportions and relative surfaces of the respective electrodes I do not claim anything new.

Having thus described my invention, I claim as new and desire to secure by Letters Patent—

1. A storage battery, comprising a containing vessel capable of holding an electrolyte, tubular members mounted within said vessel and communicating with each other through the agency of said electrolyte, wafers containing active material and mounted upon said tubular members, and electrical connections for said tubular members.

2. In a storage battery, the combination of a containing vessel, a hollow metallic member mounted therein, an insulating material disposed within said hollow metallic member for the purpose of strengthening the same, and members containing active material and stacked upon said hollow metallic members.

3. In a storage battery, a conductor consisting of a tubular member provided with an integral rib for supporting the same, said rib extending substantially throughout the length of said tubular member, and members of active material threaded upon a portion of said tubular member stiffened by said rib.

4. In a storage battery, a tubular member provided with a stiffening-rib integral therewith, and members containing active material and mounted upon said tubular member.

5. In a storage battery, the combination of a central tubular member provided with electrical connections, members containing active material and mounted upon said central tubular member, a plurality of electrodes of opposite sign connected together, and disposed substantially in the form of a ring surrounding said central tubular member, and electrical connections for said last-mentioned electrodes.

6. A storage battery, comprising a central tube made of conducting material and provided with a stiffening-rib integral therewith, a mass of insulating material disposed within said central tube, a plurality of annular wafers, each carrying active material and mounted upon said central tubular member, a metallic ring encircling said central tubular member, a plurality of tubular members connected integrally with said matallic ring, a plurality of absorbent wafers of active material stacked upon said last-mentioned tubular members, and electrical connections of different sign for said central tubular member and for said tubular members encircling the same.

7. In a storage battery, a composite wafer comprising a plurality of distinct layers of active material placed together in the manner of the leaves in a book, said wafer having substantially a general kidney shape, and means for connecting said wafer with a conductor.

8. In a storage battery, a composite wafer consisting of metallic plates and layers of active material, said layers and plates being connected together and forming a wafer, the middle of which is thicker than the edges thereof.

9. In a storage battery, a composite wafer consisting of a plurality of distinct layers of active material connected together, and metallic plates sandwiched between divers groups of such layers, said wafers each being comparatively thick at its middle portion and tapering off comparatively thin at its edges.

10. In a storage battery, a wafer of substantially kidney shape provided toward its ends with apertures extending through its substance for the purpose of enabling said wafer to be mounted upon a pair of tubular members.

In testimony whereof I have signed my name to this specification in the presence of two subscribing witnesses.

ABRAHAM V. MESEROLE.

Witnesses:
 FRANK L. BROWNE,
 THEODORE E. GREEN.